(12) United States Patent
Schmid et al.

(10) Patent No.: US 6,754,249 B2
(45) Date of Patent: Jun. 22, 2004

(54) LASER RESONATOR FOR GENERATING POLARIZED LASER RADIATION

(75) Inventors: Marc Schmid, Bern (CH); Thomas Graf, Urtenen (CH)

(73) Assignee: Universität Bern, Bern (CH)

( * ) Notice: Subject to any disclaimer, the term of this patent is extended or adjusted under 35 U.S.C. 154(b) by 0 days.

(21) Appl. No.: 09/946,533

(22) Filed: Sep. 6, 2001

(65) Prior Publication Data

US 2002/0061037 A1 May 23, 2002

(51) Int. Cl.$^7$ .................................................. H01S 3/08
(52) U.S. Cl. ........................... 372/106; 372/27; 372/32; 372/92; 372/99; 372/105
(58) Field of Search ................................. 372/106, 105, 372/99, 92, 32, 27

(56) References Cited

U.S. PATENT DOCUMENTS

| | | | | |
|---|---|---|---|---|
| 3,914,710 A | * | 10/1975 | Young | 372/108 |
| 5,384,798 A | * | 1/1995 | Zucker et al. | 372/26 |
| 5,974,060 A | * | 10/1999 | Byren et al. | 372/19 |
| 6,157,663 A | * | 12/2000 | Wu et al. | 372/75 |
| 6,347,102 B1 | * | 2/2002 | Konno et al. | 372/22 |
| 6,384,966 B1 | * | 5/2002 | Dymott | 359/347 |

OTHER PUBLICATIONS

Giuliani, Giampiero et al., Polarization Flip Cavities: A New Approach to Laser Resonators, pp. 109–112, Oct. 1980, Optics Communications, vol. 35, No. 1.

Clakson, W.A. et al., Simple Method for Reducing the DePolarization Loss Resulting from Thermally Induced Brirefringence in Solid-State Lasers, pp. 820–822, Jun. 15, 1999, Optics Letters, vol. 24, No. 12.

Pigeon, F. et al., Polarizing Grating Mirror for CW ND: YAG Microchip Lasers, pp. 648–650, Jun. 2000, IEEE Photonics Technology Letters, vol. 12, No. 6.

* cited by examiner

Primary Examiner—Paul Ip
Assistant Examiner—Delma R. Flores Ruiz
(74) Attorney, Agent, or Firm—Birch, Stewart, Kolasch & Birch, LLP

(57) ABSTRACT

A method for generating polarized laser output radiation utilizes a laser resonator whose active medium exhibits thermally induced birefringence. The radiation fields oscillating in the laser resonator are not subjected to polarization selection, and only the radiation field exhibiting the desired polarization state (p) is partially output. Only a prescribed polarization of the radiation fields of the laser radiation which can oscillate in the resonator can be partially output from the resonator with a prescribed output level and all differently polarized radiation fields remain in the resonator in a completely reflecting fashion.

11 Claims, 2 Drawing Sheets

US 6,754,249 B2

LASER RESONATOR FOR GENERATING POLARIZED LASER RADIATION

TECHNICAL FIELD

The invention relates to a method for generating polarized laser radiation in accordance with Patent claim 1, and to a laser resonator for generating a polarized laser radiation in accordance with the respective preamble of Patent claim 5 or 11, respectively.

Resonator mirrors are understood as mirrors between which a radiation field oscillates. Each oscillator generally has a highly reflecting mirror and an output mirror exhibiting a somewhat lower reflection via which a portion of the radiation field is output to be used for the most varied aims. Mirrors inside the resonator which are used to deflect radiation or for other purposes are not understood here as resonator mirrors.

In the method according to the invention described below, or in the laser resonator according to the invention, a polarization state or a polarization distribution are understood as linear and circular polarizations. Also included here, however, are radially extending or aligned polarization states and tangentially extending or aligned ones such as can occur, in particular, in the case of cylindrically symmetrically pumped, thermally birefringent laser rods. Also included here, moreover, are other arbitrary directions of polarization which vary with location over the beam cross section.

SUMMARY OF THE INVENTION

OBJECT OF THE INVENTION

The object of the invention is to create a laser resonator of simple design for the purpose of generating polarized radiation which exhibits high efficiency and ease of adjustment and thus excellent radiation stability.

ACHIEVEMENT OF THE OBJECT

The object is achieved by virtue of the fact that of the radiation fields oscillating in the laser resonator, it is only one radiation field (radiation) exhibiting a prescribed polarization distribution that is partially output. The remaining radiations remain oscillating in the resonator with the inclusion of the proportion, remaining in the resonator, of the partially output radiation. Use is made for this purpose of a laser resonator exhibiting a highly reflecting resonator mirror and a radiation output device as well as an active medium. The radiation output device is designed in such a way that of the radiation fields oscillating in the resonator and exhibiting an arbitrary polarization it is only a prescribed, in particular a single polarization that can be output from the resonator with a prescribed output level. All differently polarized radiation fields as well as the respective remaining radiation field of the partially output radiation remain reflecting completely in the resonator up to a tolerance.

All the radiation fields in the laser resonator are preferably caused to oscillate between the two resonator mirrors.

Energy transfer is preferably undertaken between the radiation fields in the laser resonator. This energy transfer can be undertaken with a phase delay in a prescribed direction of polarization. Thus, the energy transfer element can be a birefringent element, preferably a thermally birefringent laser crystal, a λ/4 plate or a Faraday rotator. The various uses are examined below.

It is also possible to use a nonlinear optical element in the resonator for outputting radiation. Frequency multiplication can then be undertaken with the aid of the element. The output mirror then preferably transmits completely only the frequency-multiplied radiation.

In the case of previously known laser resonators exhibiting thermally induced birefringent solid state laser media such as are preferably used in the case of high power lasers, great efforts have been made to compensate precisely this thermally induced birefringence. By contrast with known laser resonators exhibiting an active medium with a thermally induced birefringence, the invention now proposes a different approach. Specifically, in the case of the invention it is no longer necessary to compensate the thermal birefringence; by contrast, it is utilized. In some design variants, it is precisely the thermally induced, birefringent active solid state medium that is utilized, inter alia, as an element for energy transfer between the differently polarized radiation fields in the resonator. It is to be noted that in one design variant all the radiation fields are retroreflected into themselves in the reflector, and only the radiation field exhibiting the desired polarization state or a desired polarization distribution is output with a prescribed transmission.

Optical resonators in which the thermally induced birefringence of the active medium is compensated by optical elements in the resonator are illustrated and described, for example in N. Hodgson, H. Weber, "Optical Resonators", starting with page 298, Springer-Verlag 1997, and in DE-A 44 15 511.

It would also be possible for a plurality of prescribed directions of polarization to be output in the case of the invention; however, it is preferred to restrict oneself to only one.

The radiation output device of the invention preferably exhibits an output mirror which transmits only a laser radiation exhibiting a prescribed polarization state or polarization distribution and a prescribed wavelength with a prescribed transmittance. Such a mirror is described, for example, in Rong-Chung Tyan, Pang-Chen Sun, Axel Scherer and Yeshayahu Fainman "Polarizing Beam Splitter Based on the Anisotropic Spectral Reflectivity Characteristic of Form-birefringent Multilayer Gratings", Optics Letters, Vol. 21, No. 10, May 15, 1996, pages 761 to 763, and in N. Bel'tyugov et al., SPIE Vol. 1782, 1992, 206–212. Such a mirror is also described in PCT/EP 00/07540.

It is also possible to make use as radiation output device of a nonlinear optical element which preferably performs in the resonator frequency multiplication of the radiation fields oscillating there. Use is then made as output mirror of a mirror which transmits, in particular completely, only one of the frequency-multiplied radiation fields having a prescribed transmission factor.

As already indicated above, an optical element exhibiting birefringence, in particular thermally induced birefringence, can be used for energy transfer between the radiation fields in the laser resonator. That is to say, in the case of solid state lasers it is possible, for example, for the thermally birefringent laser crystal already to serve as active medium for the energy transfer.

The energy transfer element can also exhibit a phase-delaying (phase-rotating action) for the radiation fields oscillating in the resonator, and can preferably be designed as a λ/4 plate or exhibit the optical action thereof. It can also be designed as a Faraday rotator.

As the theory set forth below shows, a depolarization of greater than 30% per resonator round-trip pass of the resonator radiation fields should be reached in the laser resonator according to the invention. In general, the thermally induced birefringence generates strong coupling in the case of high-power laser crystals. In the case of low pumping powers, in which the depolarization is slight, it is possible to achieve a "sufficient" depolarization by means of additional elements such as a λ/4 plate, a Faraday rotator, etc.

However, there is also the possibility that of the radiation fields which can be built up in the resonator, it is only to be those which are not depolarized by the thermally induced birefringence of the active medium that are fed back up to an output level. In this case, at least one of the two resonator mirrors reflects only radiation fields having a polarization distribution which is not subjected to any depolarization on passage through the active medium, and does not reflect all radiation fields having other polarization states or also only to a slight extent which does not suffice to produce build up, such that no other radiation fields having different polarization states can buildup in the resonator. The highly reflecting mirror or the output mirror or (although this yields no advantage) both mirrors can now be provided with such a mirror coating.

High-power lasers exhibiting good beam quality can be produced with the aid of the laser resonator according to the invention or design variants thereof. A good beam quality, for example, with circular polarization, is used, for example, for material cutting in the case of industrial lasers.

BRIEF DESCRIPTION OF THE DRAWINGS

Examples of the method and/or laser resonator according to the invention are explained in more detail below with the aid of the following drawings. Further advantages of the invention follow from the text of the description. In the drawing.

WAYS OF IMPLEMENTING THE INVENTION

Figure 1:
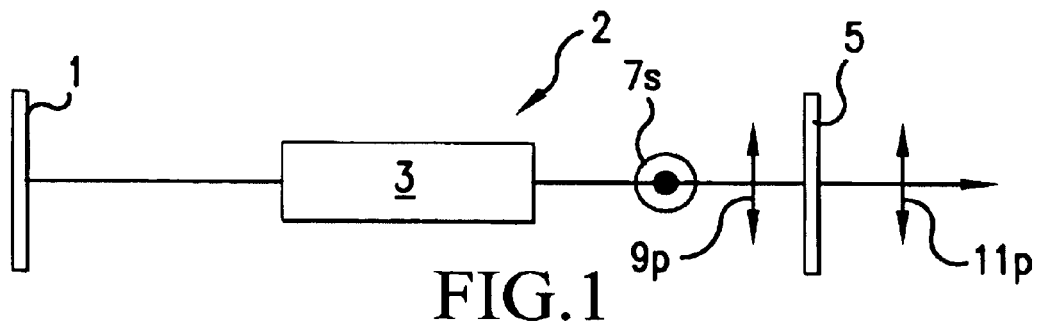
FIG. 1 shows a diagrammatic illustration of the laser resonator according to the invention with a thermally birefringent laser crystal.

The laser resonator 2 illustrated in FIG. 1 has a highly reflecting mirror (sometimes also called a 100% mirror) 1, an active medium 3 and a radiation output device 5. The active medium 3 is an Nd:YAG laser crystal with a diameter of 4 mm and length of 28.8 mm.

It is arranged between the highly reflecting mirror 1 and the output device 5. The laser crystal 3 is pumped transversely over a length of 10 mm by six laser diodes with a wavelength of $\lambda_p$=809 nm. The laser wavelength generated is situated at $\lambda_l$=1.064 μm. A laser head consisting of the laser crystal 3 and the arrangement of the pumping laser diodes is described, for example, in A. Lucianetti et al., "Thermo-optical properties of transversal pumped composite YAG rods with Nd-doped core", IEEE Journal of Quantum Electronics, Vol. 36, pages 220–227, February 2000.

The highly reflecting mirror 1 has as high a reflection as possible for the laser radiation $\lambda_l$=1.064 μm to be generated; that is to say up to a tolerance of 100%. The output device 5 consists here of a polarizing mirror. A multiplicity of radiation fields (which can also be designated as modes under certain preconditions) exhibiting all possible directions of polarization and/or polarization states oscillate in the laser resonator 2 in the steady-state condition. Only the radiation fields 7s oscillating perpendicular to the plane of the drawing, and the radiation fields 9p oscillating parallel therewith are indicated in FIG. 1. All other radiation fields can be decomposed vectorally into this direction. The polarizing mirror 5 is now designed in such a way that it has a reflectance of 1 (up to a tolerance) for all radiation fields up to the polarization 9p parallel to the plane of the drawing. That is to say, these radiation fields are retroreflected completely into themselves. A portion of the energy of the parallel-polarized radiation fields 9p is transmitted, however, by this mirror 5 as beam 11. The transmittance of the mirror 5 is governed in accordance with the statements made below by the gain of the laser crystal 3 or by the pumping power.

The highly reflecting mirror 1 has a spacing $l_c$ of 210 mm from the polarizing mirror 5. The laser crystal 3 has a spacing of 60 mm from the highly reflecting mirror 1, and of 35 mm from the polarizing mirror 5.

Figure 2:
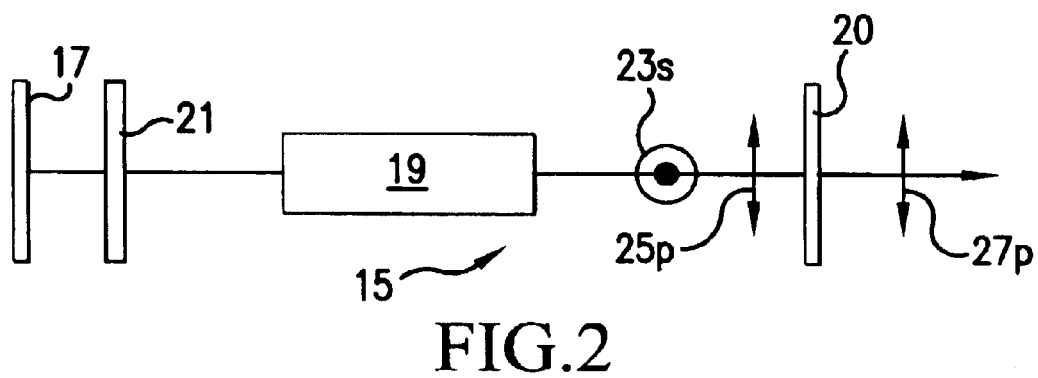
FIG. 2 shows a variant of the laser resonator illustrated in FIG. 1 exhibiting a λ/4 plate.

In a way similar to the resonator 2 illustrated in FIG. 1, the resonator 15 illustrated in FIG. 2 likewise has a highly reflecting mirror 17, a thermally birefringent laser crystal 19 as active medium, and a polarizing mirror 20 as radiation output device. In addition, the resonator 15 includes a λ/4 plate 21. The optical axis of the λ/4 plate 21 is arranged here at 45° to the direction of the radiation fields oscillating parallel to the plane of the drawing. The λ/4 plate 21 converts the polarization of the radiation field in the laser resonator 15 into a circularly polarizing radiation field in the case of a single passage, and into a linearly polarized radiation field in the case of the return path after total reflection at the highly reflecting mirror 17, said linearly polarized radiation field being rotated, however, by 90° by comparison with the outgoing radiation field. A radiation p oscillating in a fashion polarized parallel to the plane of the drawing is thereby rotated into one s oscillating perpendicular thereto. In a way similar to the illustration in FIG. 1, here, as well, the perpendicular direction of polarization s (radiation field oscillating perpendicular to the plane of the drawing, or a radiation having a radiation vector that can be decomposed in this direction) is marked by 23s and the parallel direction of polarization p, rotated by 90° thereto, is marked by 25p. Here, with a prescribed transmission of 0.2, for example, the output beam 27p exhibiting a parallel polarization p passes through the polarizing mirror 20.

The energy transfer between the radiation fields (modes), oscillating in different directions of polarization, in the laser resonator 15 is undertaken here by the λ/4 plate 21 and, if the laser crystal 19 is additionally birefringent, by the laser crystal 19 and λ/4 plate 21. A weak thermal birefringence of the laser crystal, for example in the case of a weak pumping power, is supported by a component, here the λ/4 plate 21, which changes the state of polarization in the resonator.

Figure 3:
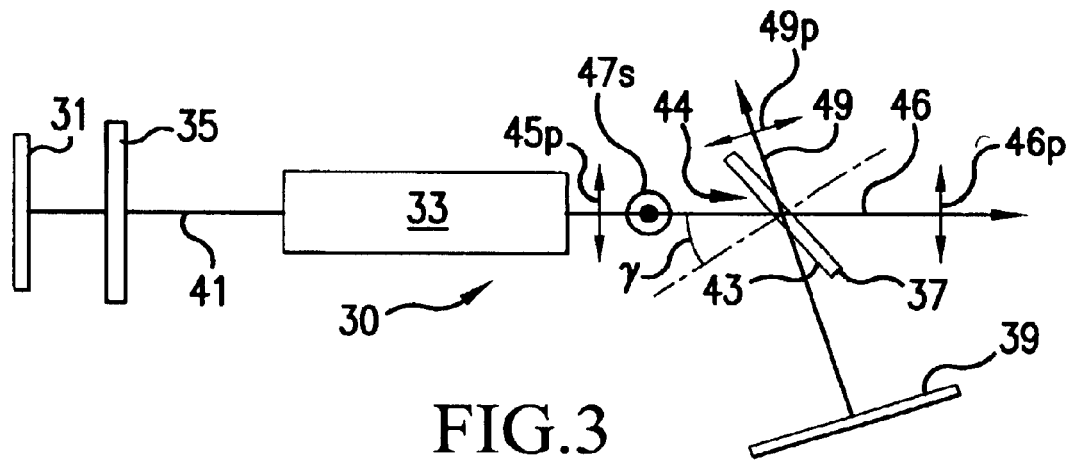
FIG. 3 shows a further design of the laser resonator according to the invention exhibiting a tilted output mirror.

In a way similar to the resonator 15 illustrated in FIG. 2, the resonator 30 illustrated in FIG. 3 likewise has a highly reflecting mirror 31, a laser crystal 33 as active medium and a λ/4 plate 35, whose action is similar to the λ/4 plate 21. However, present here as radiation output device is an inclined optical element 37, provided with dielectric coatings on its surfaces, and a further highly reflecting mirror 39. The optical element 37 is a plane-parallel member transparent to the laser radiation. It is arranged inclined at an angle γ to the optical resonator axis 41, and has on its surface 43 facing the laser crystal 33 a dielectric coating arrangement 44 which, as indicated here, transmits a polarized radiation field 45p parallel to the plane of the drawing in accordance with the desired output level, for example with a transmission of 0.12. The radiation fields 47s polarized perpendicular thereto are reflected virtually completely and retroreflected into themselves via the highly reflecting mirror 39. Since, however, only 12% of the radiation polarized parallel to the plane of the drawing was led away as output beam 46 with a p polarization 46p, the remaining 88% is likewise reflected and retroreflected by the mirror 39, the optical element 37 then transmitting 12% as second output beam 49, likewise with a p polarization 49p. The two output beams 46 and 49 can preferably be coherently superimposed to form a single beam, taking account of the different transit times (twice the spacing between the mirror 39 and optical element 37).

Here, as well, all the resonator radiation fields are caused to oscillate by a single optical resonator (=a single eigenvalue equation), specifically the highly reflecting mirror 31—λ/4 plate 35—laser crystal 33—optical element 34—highly reflecting mirror 39 and back again.

Figure 4:
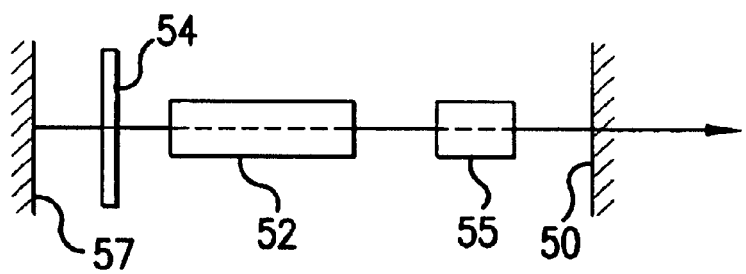
FIG. 4 shows a further design variant with a nonlinear optical element.

In a way similar to that shown in FIG. 2, the laser resonator 53 illustrated in FIG. 4 is likewise designed with a laser crystal 52 as active medium, a λ/4 plate 54, an output mirror 50 and a highly reflecting mirror 57. However, it has as additional element an optically nonlinearly operating element 55 with the aid of which it is possible to undertake frequency coupling. The output mirror 50 is designed in such a way that the "frequency-doubled radiation" is passed, whereas the "non-doubled" radiation is not.

A polarization-selective resonator mirror can now be designed in such a way that only radiation fields exhibiting a prescribed polarization distribution are reflected, specifically for those which are not subjected to depolarization upon passage through the thermally induced birefringent active medium. All differently polarized radiation fields are not reflected or are reflected only to a slight extent via this resonator mirror. These differently polarized radiation fields can therefore no longer build up in the resonator. Such a laser resonator for generating a polarized laser output radiation then has only the active medium and the two resonator mirrors. It is now possible to design the highly reflecting resonator mirror, or else the output mirror, in a polarization-selective fashion. For reasons of cost, however, the highly reflecting resonator mirror will be designed in a polarization-selective fashion; that is to say it reflects only one prescribed state of polarization, and does not reflect all the others, or does so only slightly. The output mirror is then no longer designed in a polarization-selective fashion. In the case of solid-state laser media in rod form which are pumped in a cylindrically symmetrical fashion, this radiation is then polarized radially or tangentially. If other configurations of active solid-state media, and other arrangements of the pumping sources, are selected, this results in different local polarization distributions over the laser beam. The polarization-selective mirror must then be adapted in accordance with its configuration.

An estimate for dimensioning the transmission of the polarizing mirrors 5 and 20, and also for the optical element 37 will be undertaken below. Because of the thermal birefringence in the laser crystal 3, 19 or 33, there is an interaction between the photons of the two mutually perpendicular directions of polarization s and p or 7s and 9p, 23s and 25p or 47s and 45p. That is to say, the two directions of polarization 7s and 9p, 23s and 25p, or 47s and 45p, and are linked to one another via a polarization lifetime $T_{Depol}$.

$T_{Depol}$ is a measure of the time duration in which one photon is in a state of polarization before it changes over into the other one.

Starting from a four-level system such as is valid, for example, for a wavelength of 1.064 μm in the case of an Nd:YAG crystal, it follows for the change in the number of ions per volumetric unit in the base level (marked by a $_g$, per time unit that $$\frac{dn_g}{dt} = \frac{n_l}{T_l} - P_n(n_g) + \frac{n_u}{T_u} \cdot \beta_{ug}.$$

It holds for the time change in the number of ions per volumetric unit in the low level (marked by a $_l$, situated directly above the ground state that $$\frac{dn_l}{dt} = \frac{n_u}{T_u} \cdot \beta_{ul} + (\Phi_s + \Phi_p) \cdot c \cdot \sigma \cdot (n_u - n_l) - \frac{n_l}{T_l}.$$

$n_u$ is the number per volumetric unit of ions in the upper excited level, and $n_l$ is the number in the lower level.

$$\frac{dn_u}{dt} = Pw(n_g) - \frac{n_u}{T_u} - (\Phi_s + \Phi_p) \cdot c \cdot \sigma \cdot (n_u - n_l)$$

$$\frac{d\phi_s}{dt} = \Phi_s c \, \sigma (n_u - n_l) \cdot \frac{l_k}{l_c} - \frac{\Phi_s}{T_s} + \frac{1}{T_{Depol}} \cdot$$

$$(\Phi_p - \Phi_s) + \cdot \frac{n_u}{T_u} \beta_{ul} \cdot \frac{l_k}{l_c}$$

$$\frac{d\Phi_p}{dt} = \Phi_p c \sigma (n_u - n_l) \cdot \frac{l_k}{l_c} - \frac{\Phi_p}{T_p} + \frac{1}{T_{Depol}} \cdot$$

$$(\Phi_s - \Phi_p) + R \cdot \frac{n_u}{T_u} \cdot \beta_{ul} \cdot \frac{l_k}{l_c}$$

$\phi_s$ and $\phi_p$ are the numbers of photons per volumetric unit in the directions of the s and p polarizations. The lifetime of the upper laser level is $T_u$=230 μs, and that of the lower laser level is $T_l$=30 ns. $\beta_{ul}$ and $\beta_{ug}$ are designated as a branching ratio and have the values of 0.8 and 0.2. R is a radiation parameter, and specifies the probability with which a spontaneously emitted photon remains in the resonator. R=10$^{-4}$. c is the speed of light. $l_k$ is the "pumpable" length of the laser crystal. $l_c$ is the resonator length. σ is the activation cross section for the stimulated emission, and is 2.8·10$^{-19}$ cm$^2$. The lifetimes of the photons in the resonator for the two directions of polarization is yielded as $$T_{s,p} = \frac{2 \cdot l_c}{c \cdot [V - \ln(1 - T_{s,p})]},$$

V specifying the internal losses, and $T_s$ and $T_p$ specifying the transmission of the polarizing mirror for directions of s and p polarizations. $T_s$=0, since only a portion of the radiation with the p polarization is output, and the s polarization is completely reflected.

The function $P_n(n_g)$ specify the number of excited ions owing to absorbed pumping radiation per time unit and per volumetric unit:

$$P_n(n_g) = \frac{P_p \cdot \eta_{trans}}{h \cdot v_p \cdot \pi \cdot r_p^2 \cdot l_k} \cdot [1 - e^{\sigma_{abs} \cdot n_g \cdot l_k}].$$

$P_p$ is the pumping power and $\eta_{trans}$ is an optical transmission coefficient for the pumping radiation. $v_p$ is the frequency of the pumping radiation; it is $3.708 \cdot 10^{14}$ Hz. $\sigma_{abs}$ is the absorption cross section for the pumping radiation; it is $3 \cdot 10^{-18}$ mm². $r_p$ is the radius of the laser crystal; it is 2 mm.

Consideration is given to the thermally induced birefringence in the laser crystal in order to estimate the polarization lifetime $T_{Depol}$. A general analytical model for this is described in M. Schmid et al., "Analytical model of the temperature distribution and the thermal birefringence in laser rods with cylindrically symmetric heating", J. Opt. Soc. Am. B; Vol. 17, No. 8, August 2000, pages 1398–1404. The coupling ratio of photons which change their polarization in a single passage is $$D_{Depol} = D_{biref} = \frac{1}{\pi \cdot r^2} \int_0^{r_{rod}} \int_0^{2\pi} b(r', \varphi) f_{beam}(r') r' d\varphi dr'.$$

b(r', φ) describes the thermal birefringence, which can be calculated in accordance with the abovementioned quotation from the literature. $D_{biref}$ is the mean thermally induced birefringence inside the laser beam. The value of $D_{biref}$ is between 0 and 0.5. If the λ/4 plate 21 is located in the resonator 15, all the photons are subjected to a rotation of polarization of 90° in the course of a resonator round-trip pass. A portion of the rotation of the polarization caused by the λ/4 plate 21 is cancelled as a consequence of the thermal depolarization.

$$D_{Depol} = 1 - D_{biref}.$$

$D_{Depol}$ is therefore between 0.5 and 1.

The polarization lifetime is yielded from this as $$T_{Depol} = \frac{2 \cdot l_c}{c \cdot D_{Depol}}.$$

The spatial distribution of the pumping light radiation and the spatial energy distribution in the laser beam need to be taken into account for the purpose of numerical analysis of the balance equations.

The following calculations relate to an approximate estimation performed with the aid of the fourth order of the Runge-Kutta method using MathCad. The length $l_c$ of the laser resonator is 210 mm. The laser crystal has a length of 28.8 mm and a radius $r_c$ of 2 mm. 10 mm ($l_k$) of the laser crystal was irradiated by the pumping light radiation $P_p$. It is assumed that the laser crystal is irradiated homogeneously. The internal losses V are 0.05, and the optical transmission coefficient $\eta_{trans}$ is 0.8.

Consideration is given firstly to the influence of the depolarization $D_{depol}$ and the transmission of the polarizing mirror 20 on the laser output power $P_{out}$ ($T_s$=0 as per definition). The pumping power $P_p$ is 196 W.

Figure 5:
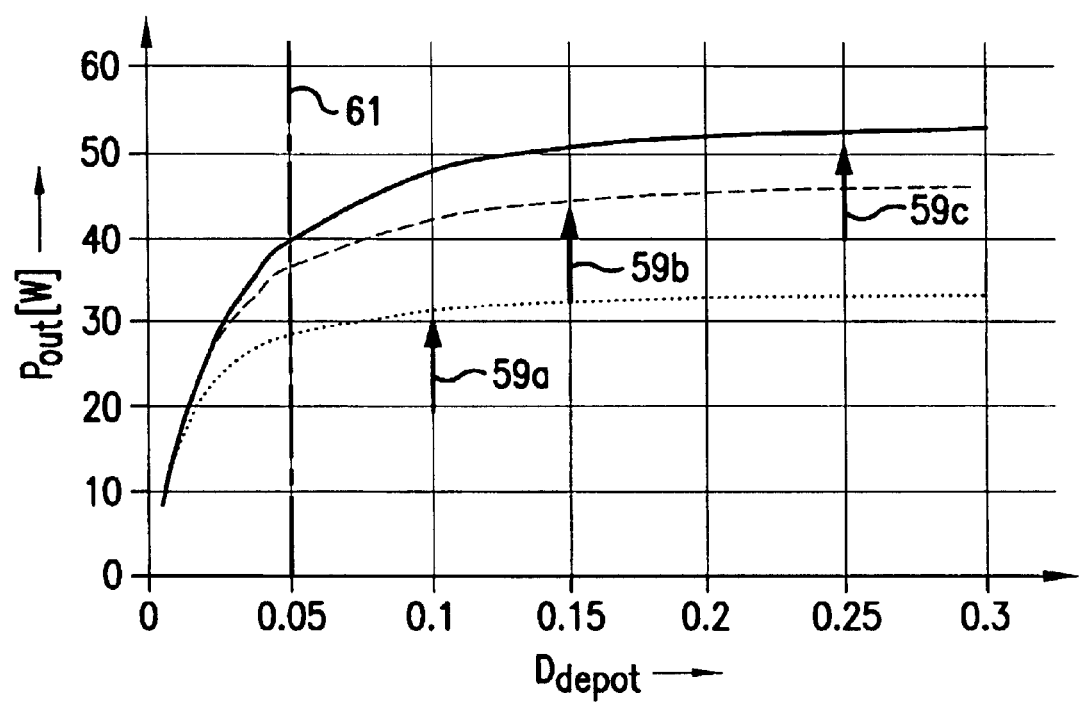
FIG. 5 shows the laser output power $P_{out}$ from the laser resonator according to the invention in accordance with FIG. 2, plotted against the polarization lifetime $T_{Depol}$.

The laser output power $P_{out}$ in watts [W] is plotted in FIG. 5 as a function of the coupling ratio $D_{Depol}$ for a different transmission of the polarizing mirror 20 for the s polarization; the transmission for the p polarization is always 0. The continuous line is valid for a transmission 0.2, while the dashed line is valid for a transmission of 0.1 and the dotted line is valid for a transmission of 0.05. Using the numerical method selected here, it was no longer possible to take account of a transmission of greater than 0.3. The vertical upwardly directed arrows 59a to 59c mark locations on the curve at which the lifetime of the photons with the p polarization $T_p$ is equal to the polarization lifetime $T_{Depol}$. The vertically running dashed and dotted line 61 in FIG. 5 indicates the locations on the curve at which $T_{Depol} = T_s$. Although the transmission for the s polarization is zero, there is, of course, loss in the resonator for this direction of polarization, as well.

For a range $T_{Depol} > T_s$, the laser output power $P_{out}$ depends strongly on the polarization coupling ratio $T_{Depol}$. However, there is also a saturation range for $T_{Depol} < T_p$. Efficient operation therefore requires that $T_{Depol} < T_p$.

If $T_{Depol}$ is less than $T_p$, the interaction between the two directions of polarization is so quick that the photons leaving the resonator are replaced by photons of the other direction of polarization.

What is claimed is:

1. A method for generating polarized laser output radiation with the aid of a laser resonator, said resonator having a highly reflecting resonator mirror;
   a radiation output device; and
   an active medium having an emission-bandwidth and exhibiting thermally induced birefringence, comprising:
      providing for a resonator having radiation fields oscillating inside only within said emission-bandwidth;
      subjecting the radiation fields to a polarization selection of a prescribed polarization state (p) by said radiation output device; and
      partially outputting only one radiation field exhibiting the prescribed polarization state (p) by said radiation output device from the oscillating radiation fields in that manner that all differently polarized radiation fields remain in the resonator in a completely reflecting fashion up to a tolerance and the remaining proportion of the radiation field of the partial output remains also oscillating inside the resonator.

2. The method according to claim 1, wherein energy transfer is undertaken between the radiation fields oscillating in the resonator.

3. The method according to claim 2, wherein the energy transfer is undertaken by a phase delay in a prescribed direction of polarization.

4. The method according to claim 1, wherein of the radiation fields buildable in the resonator it is only those which are not depolarized by the thermally induced birefringence of the active medium that are fed back up to an output.

5. A laser resonator for generating a polarized laser output radiation comprising:
   a highly reflecting resonator mirror;
   a radiation output active device; and
   an active medium having an emission-bandwidth and exhibiting thermal birefringence, said active medium emitting radiation fields having frequencies within said emission-bandwidth,
   wherein the radiation output device is designed in such a way that only a prescribed polarization state or a prescribed polarization of the radiation fields of the laser radiation oscillating in the resonator is only partially output from the resonator with a prescribed output level ($T_p$), and all differently polarized radiation fields remain in the resonator in a completely reflecting fashion up to a tolerance and the remaining proportion of the radiation field of the partial output remains also oscillating inside the resonator.

6. The laser resonator according to claim 5, wherein present in the resonator is at least one optical energy transfer element which effects a non-negligible energy transfer between the differently polarized radiation fields in the resonator.

7. The laser resonator according to claim 5, wherein the radiation output device exhibits an output mirror which transmits only a prescribed polarization distribution (p) of the radiation fields in the resonator with a prescribed transmittance ($T_p$), and all the radiation fields preferably oscillate between one and the same two resonator mirrors.

8. The laser resonator according to claim 6, wherein the energy transfer element exhibits birefringence, in particular thermally induced birefringence for the radiation fields oscillating in the resonator.

9. The laser resonator according to claim 6, wherein the energy transfer element exhibits a phase-delaying action for a polarization state of the radiation fields oscillating in the resonator and is preferably designed as a $\lambda/4$ plate or exhibits the optical action thereof, or is designed, in particular, as a Faraday rotator or exhibits the optical action thereof.

10. The laser resonator according to claim 9, wherein the radiation output device has a nonlinear optical element, which preferably performs a frequency multiplication in the resonator of the radiation fields oscillating there, and an output mirror which transmits, in particular completely, only the frequency-multiplied radiation having a prescribed transmission factor.

11. A laser resonator for generating a polarized laser output radiation comprising:

a highly reflecting resonator mirror;

an output resonator mirror; and an active medium exhibiting thermally induced birefringence, wherein at least one of the two resonator mirrors reflects only radiation fields having a polarization distribution which is not subjected to any depolarization on passage through the active medium, and does not reflect all radiation fields having other polarization states or also only to a slight extent which does not suffice to produce buildup, such that no other radiation fields having different polarization states being build up in the resonator.

* * * * *

UNITED STATES PATENT AND TRADEMARK OFFICE
CERTIFICATE OF CORRECTION

PATENT NO. : 6,754,249 B2
DATED : June 22, 2004
INVENTOR(S) : Marc Schmid and Thomas Graf It is certified that error appears in the above-identified patent and that said Letters Patent is hereby corrected as shown below:

Column 8,
Lines 43-60, claim 5 should be amended as follows:

5. A laser resonator for generating a polarized laser output radiation comprising:
a highly reflecting resonator mirror;
a radiation output device; and
an active medium having an emission-bandwidth and exhibiting thermal birefringence, said active medium emitting radiation fields having frequencies within said emission-bandwidth,
wherein the radiation output device is designed in such a way that only a prescribed polarization state or a prescribed polarization of the radiation fields of the laser radiation oscillating in the resonator is only partially output from the resonator with a prescribed output level ($T_p$), and all differently polarized radiation fields remain in the resonator in a completely reflecting fashion up to a tolerance and the remaining proportion of the radiation field of the partial output remains also oscillating inside the resonator.

Signed and Sealed this

Second Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,754,249 B2  Page 1 of 1
DATED : June 22, 2004
INVENTOR(S) : Marc Schmid and Thomas Graf It is certified that error appears in the above-identified patent and that said Letters Patent is hereby corrected as shown below:

<u>Title page,</u>
Item [30], Foreign Application Priority Data, add
 -- EUROPE   00 810 810.2   September 8, 2000 --

Signed and Sealed this

Tenth Day of May, 2005

JON W. DUDAS
*Director of the United States Patent and Trademark Office*